A. Duus.
Grain Winnower.
Nº 108,120. Patented Oct. 11, 1870.
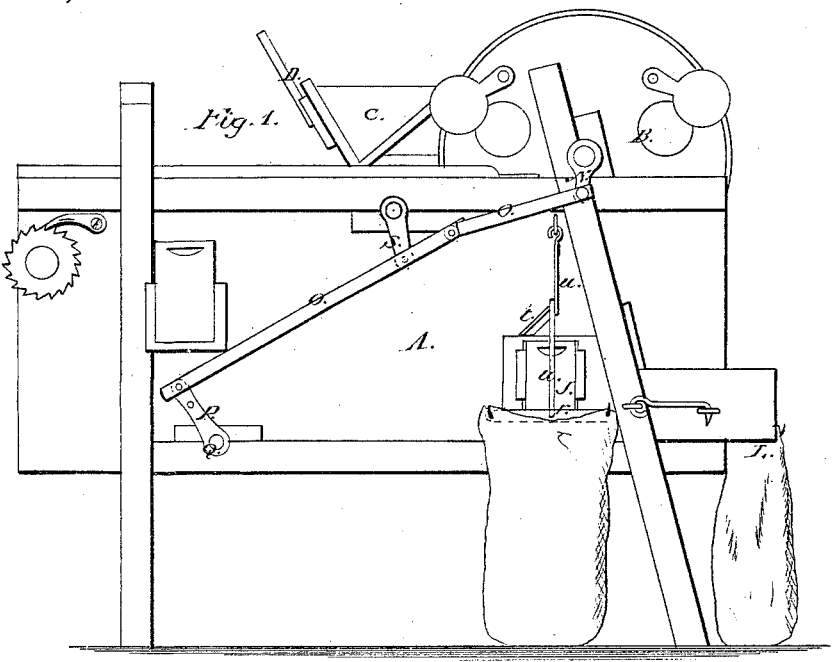
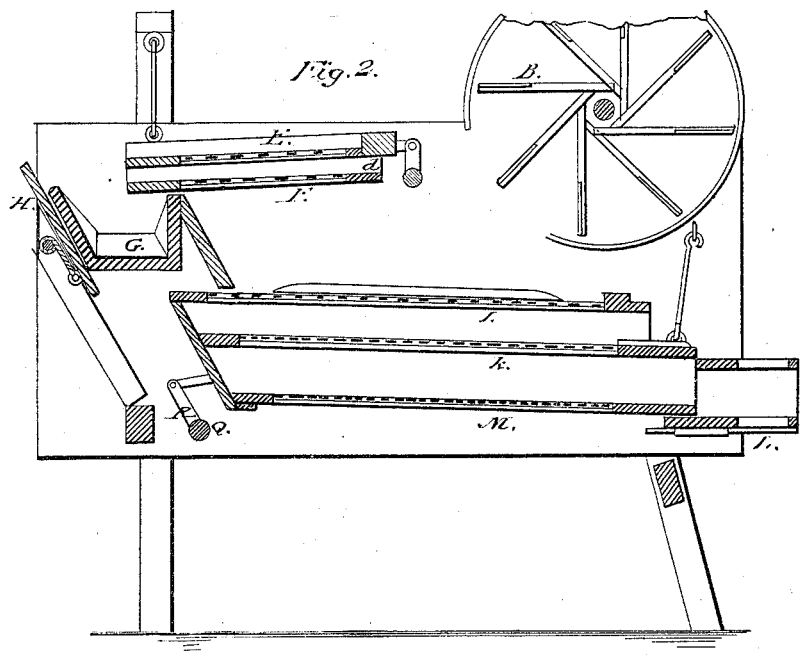
Witnesses:
Geo. H. Strong.
Wm. R. Bane.
Inventor:
Antony Duus.

UNITED STATES PATENT OFFICE.

ANTONY DUUS, OF SAN FRANCISCO, CALIFORNIA.

IMPROVEMENT IN GRAIN-SEPARATORS.

Specification forming part of Letters Patent No. 108,120, dated October 11, 1870.

*To all whom it may concern:*

Be it known that I, ANTONY DUUS, of the city and county of San Francisco, State of California, have invented an Improved Grain-Separator; and I do hereby declare the following description and accompanying drawing are sufficient to enable any person skilled in the art or science to which it most nearly appertains to make and use my said invention or improvements without further invention or experiment.

The object of my invention is to provide an improvement in grain-separators or cleaners such as are used to free wheat from chaff, barley, cheat, and mustard; and it consists of an arrangement of screens in a suitable frame in such a manner that the straw and chaff will be thrown off from the upper screen by a fan-blower. The barley will be caught by another lower screen and conveyed by its inclination and motion to a point from which it will pass into sacks. The wheat will be arrested in a similar manner by a third screen, and the smaller grains, like mustard, will be saved by a fourth and last screen.

My invention further consists in a novel device by which the proper motion is given to each screen or set of screens.

Referring to the accompanying drawing for a more complete description of my invention, A is a suitable frame or support for the various mechanisms to be employed. At the upper part, and near one end, is placed the fan-blower B, and directly in front of this is placed the hopper C, into which the grain to be cleaned is placed, and from which it is delivered through a slide-door, D, which regulates the amount. The mass first falls upon the shaking-screen E, and the blast from the fan carries off the chaff. Some barley and light grain will be caught by the screen F and pass over by the force of the blast into the incline G, from which it passes by a sliding door at one side, and may be sacked.

A gate, H, is arranged at the front, and by raising or lowering this, more or less of the light grain will be caught and may be saved for feed. These two screens have the same motion, being fastened in the same frame.

The screens below are so connected as to receive motion in the opposite direction by devices which will be hereafter explained.

Below the screen F is the barley-screen proper, I. This screen is placed in the shaking-frame so as to have a small inclination backward, and this and the motion cause the barley to gradually pass to the rear, where a trough conveys it to the gate J at one side, from which it can be sacked.

Below the barley-screen, and in the same frame, is the wheat-screen K. This is made with meshes fine enough to catch the wheat, and, by its inclination, convey it to the spout, from which it falls into the sacks, as shown at L.

The mustard-screen M—the finest of all—lies still lower than the wheat-screen, and receives its motion from the same frame. This screen conveys whatever small seeds and imperfect wheat that falls upon it to a sack placed by the side of the wheat-sack, and in a similar manner.

Motion is given to the fan by a crank through a wheel and pinion at one side of the machine.

The fan-shaft extends through the opposite side of the machine, and has a crank, N, made fast to it. A jointed connecting-rod, O, extends downward at an angle, and attaches to a rocker-arm, P, upon the end of a shaft, Q. A similar arm, R, rises from the center of the shaft, and is connected with the frame which carries the three screens I, K, and M, thus giving them a shaking forward-and-back motion. The arm S is so connected with the rod O that it gives the frame $d$ within the machine a shaking motion in an opposite direction from the lower frame, and thus facilitates the separation.

In order to keep the sacks open while filling, they are first attached to hooks at each side of the discharge-spout. A short bar, $r$, is constructed with a sharp point at each end. This is placed in the mouth of the sack, and pressed out from the side of the machine by a short brace, $t$, which presses against the spring-bar $u$. This latter bar has one end made fast to the side of the machine, and the other end to the bar $r$; and by this device the sack is kept in place without more attention, and will not fall in so as to spill the grain.

Having thus described my invention, what I claim, and desire to secure by Letters Patent, is—

1. The relative arrangement of the two sets of screens E and F and I, K, and M, in combination with the cranks N, P, and S, and connecting-rod O, arranged, as described, to give motion in opposite directions to the two sets directly from the shaft of the fan, substantially as set forth.

2. The device for holding open the mouth of the bag, consisting of the bars $r$ and $u$ and the brace $t$, constructed and arranged substantially as specified.

In witness that the above-described invention is claimed by me I have hereunto set my hand and seal.

ANTONY DUUS. [L. S.]

Witnesses:
  WM. R. BOONE,
  GEO. H. STRONG.